(12) United States Patent
Tsuno et al.

(10) Patent No.: US 12,176,707 B2
(45) Date of Patent: Dec. 24, 2024

(54) DC BUS CONTROL SYSTEM

(71) Applicant: RIKEN, Wako (JP)

(72) Inventors: Katsuhiko Tsuno, Wako (JP); Katsushi Fujii, Wako (JP); Kayo Koike, Wako (JP); Satoshi Wada, Wako (JP)

(73) Assignee: RIKEN, Wako (JP)

(*) Notice: Subject to any disclaimer, the term of this patent is extended or adjusted under 35 U.S.C. 154(b) by 70 days.

(21) Appl. No.: 18/011,942

(22) PCT Filed: May 10, 2021

(86) PCT No.: PCT/JP2021/017714
§ 371 (c)(1),
(2) Date: Dec. 21, 2022

(87) PCT Pub. No.: WO2021/261094
PCT Pub. Date: Dec. 30, 2021

(65) Prior Publication Data
US 2023/0208134 A1 Jun. 29, 2023

(30) Foreign Application Priority Data

Jun. 22, 2020 (JP) ................. 2020-107092

(51) Int. Cl.
*H02J 1/12* (2006.01)
*H02J 7/00* (2006.01)
*H02J 7/35* (2006.01)

(52) U.S. Cl.
CPC .............. *H02J 1/12* (2013.01); *H02J 7/0013* (2013.01); *H02J 7/35* (2013.01)

(58) Field of Classification Search
CPC .... H02J 1/12; H02J 7/0013; H02J 7/35; H02J 1/00; H02J 1/102; H02J 3/36; H02J 7/00; H02J 7/34

See application file for complete search history.

(56) References Cited

U.S. PATENT DOCUMENTS

| 2004/0051387 A1 | 3/2004 | Lasseter et al. |
| 2014/0084872 A1* | 3/2014 | Iida ............ H02J 7/00711 320/126 |

(Continued)

FOREIGN PATENT DOCUMENTS

| JP | 2005-539476 A | 12/2005 |
| WO | WO 2019/103059 A1 | 5/2019 |

OTHER PUBLICATIONS

International Search Report, issued in PCT/JP2021/017714, PCT/ISA/210, dated Jul. 20, 2021.

(Continued)

*Primary Examiner* — Lincoln D Donovan
*Assistant Examiner* — Alex W Lam
(74) *Attorney, Agent, or Firm* — Birch, Stewart, Kolasch & Birch, LLP

(57) ABSTRACT

A DC bus control system for controlling power fluctuations in a DC bus connecting an input power source and a load, comprising: a main stabilization device including a first charging/discharging element and a first power converter; a plurality of the sub stabilization devices including a second charging/discharging element, a charging element, or a discharging element and a second power converter, wherein the plurality of the sub stabilization devices includes a first sub stabilization device having a charging/discharging element and a second power converter and at least one second sub stabilization device having a charging element or a discharging element and a second power converter, and a response speed of the first sub stabilization device is set such that a charging amount of the charging element or a discharging amount of the discharging element of the second sub stabilization device changes with a predetermined time constant.

14 Claims, 13 Drawing Sheets

(56) References Cited

U.S. PATENT DOCUMENTS

2016/0072394 A1* 3/2016 Deboy .................. H02M 7/217
　　　　　　　　　　　　　　　　　　　　363/21.1
2017/0366023 A1* 12/2017 Tanaka ................ H01M 10/425
2020/0280183 A1    9/2020 Yamashita et al.

OTHER PUBLICATIONS

Written Opinion of the International Searching Authority, issued in PCT/JP2021/017714, PCT/ISA/237, dated Jul. 20, 2021.

* cited by examiner

DC BUS CONTROL SYSTEM

TECHNICAL FIELD

The present disclosure relates to a DC bus control system.

BACKGROUND ART

In recent years, power supply systems using renewable energy, such as sunlight, wind power, and wave power, have attracted attention as power sources alternative to fossil energy and nuclear energy, and some of these are already in practical use.

This type of the power supply system generates power that significantly fluctuates depending on the weather, season, location, and the like. For this reason, to maintain the voltage of a DC bus, to which the power supply system is connected, within a predetermined allowable range, a power source, such as a solar cell or a wind power generator, is desirably connected to the DC bus via a power converter having a wide input range and large capacity. However, in this case, the increased capacity of the power converter may increase the size, complexity, or costs of the entire system.

The applicant of the present application has proposed a control system for efficiently controlling power fluctuations in a DC bus caused by fluctuations in an input power source and a load (PTL 1). In the control system of PTL 1, the main stabilization device controls the DC bus voltage on the basis of the power storage amount index to control a fuel cell, a water electrolysis cell, and a power storage device. The control system of PTL 1 can efficiently control power fluctuations in the DC bus caused by fluctuations in the input power source and the load.

However, the control system of PTL 1 aims at quicker stabilization of the DC voltage, and does not take into consideration the deterioration of the water electrolysis cell (charging element) and the fuel cell (discharging element). Water electrolysis cells and fuel cells deteriorate when operated with excessively large or small current or voltage, or when the current or voltage fluctuates too rapidly. Any deterioration of the water electrolysis cell or fuel cell hinders long-term continuous operation.

CITATION LIST

Patent Literature

[PTL 1] WO 2019/103059

SUMMARY OF INVENTION

Technical Problem

It is an object of the present invention to provide a control system that can efficiently control power fluctuations in a DC bus caused by fluctuations in an input power source or a load, and can operate stably for a long period of time.

Solution to Problem

A DC bus control system for controlling power fluctuations in a DC bus connecting an input power source and a load, the DC bus control system comprising: a main stabilization device including a first charging/discharging element and a first power converter; a plurality of the sub stabilization devices including a second charging/discharging element, a charging element, or a discharging element and a second power converter, wherein the first power converter is configured to obtain a bus voltage target value and transmit and receive DC power bidirectionally between the first charging/discharging element and the DC bus such that a voltage of the DC bus matches the bus voltage target value, wherein the second power converter is configured to obtain a current target value according to a difference between a threshold value regarding charging or discharging of the second charging/discharging element, the charging element or the discharging element and the voltage of the DC bus, and to transmit, and receive DC power between the second charging/discharging element, the charging element or the discharging element, and the DC bus such that a current equal to the current target value flows to the second charging/discharging element, the charging element or the discharging element, wherein the plurality of the sub stabilization devices includes a first sub stabilization device having a charging/discharging element and a second power converter and at least one second sub stabilization device having a charging element or a discharging element and a second power converter, and wherein a response speed of the first sub stabilization device is set such that a charging amount of the charging element or a discharging amount of the discharging element of the second sub stabilization device changes with a predetermined time constant.

Advantageous Effects of Invention

According to the present invention, a control system is provided that can efficiently control power fluctuations in a DC bus caused by fluctuations in an input power source or a load, lowers the response speed of a charging element or a discharging element of a sub stabilization device to prevent its deterioration, and operate stably over the long term.

DESCRIPTION OF EMBODIMENTS

Embodiments of the present invention are described below with reference to the drawings.

First Embodiment

Figure 1:
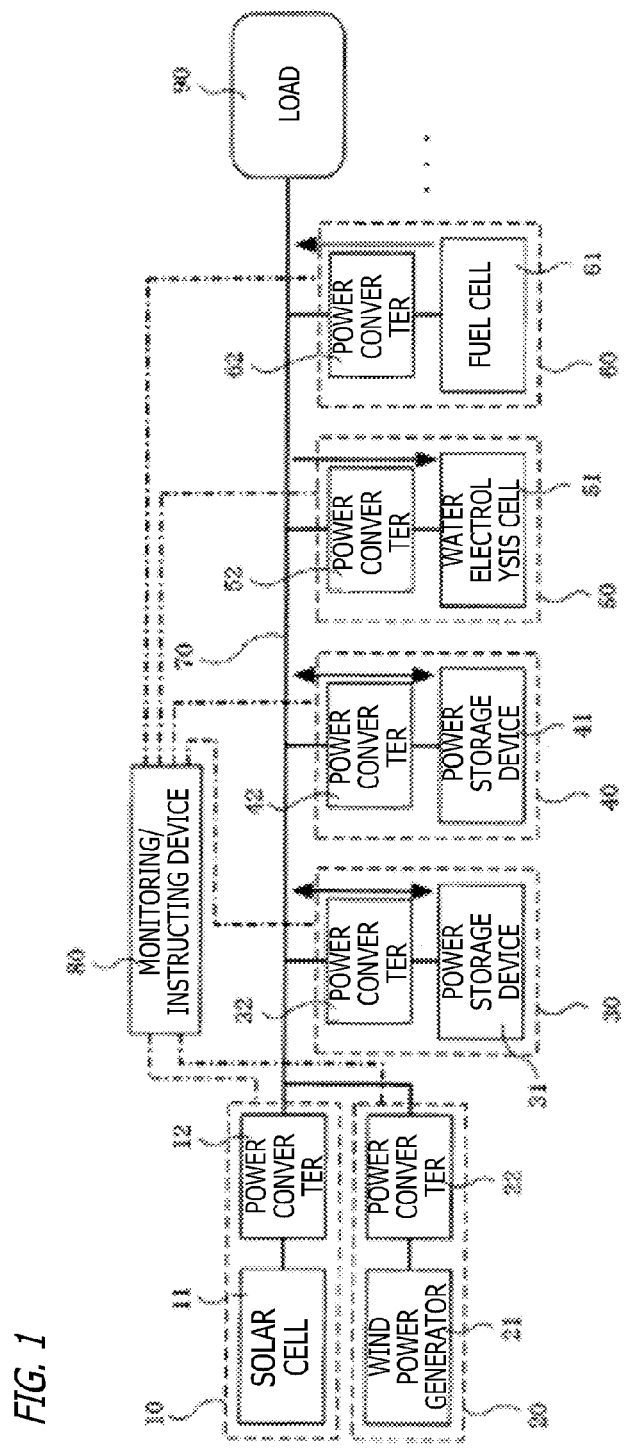
FIG. 1 is an overall block diagram of a DC bus control system according to an embodiment.

FIG. 1 is an overall block diagram of a DC bus control system according to an embodiment. The DC bus control system shown in FIG. 1 includes a photovoltaic power generation system 10 and a wind power generation system 20, which are renewable energy power supply systems, as input power sources. These power generation systems 10 and 20 are connected in parallel and their output sides are connected to a DC bus 70. The photovoltaic power generation system 10 includes a solar cell 11 and a power converter 12, and the wind power generation system 20 includes a wind power generator 21 and a power converter 22.

The input power sources may be any power source. When the input power source is a renewable energy power supply system, it may use energy other than the above, such as wave power or geothermal heat, or it may be a power supply system of hydropower (small hydropower) power, tidal power, tidal current power, ocean thermal energy conversion, or the like. Also, it may be a combination of these including those described above.

Furthermore, there is no limitation to the number of the power supply systems connected in parallel with each other.

The DC bus 70 is connected with a main stabilization device 30 and sub stabilization devices 40, 50, and 60 and also with a load 90.

The main stabilization device 30 sets a variable bus voltage target value within a predetermined allowable range centered on the reference bus voltage (reference voltage of the DC bus 70), and controls the charging and discharging of the power storage device 31 by operating the power converter 32 such that the output voltage of the DC bus 70 matches the bus voltage target value.

The sub stabilization device 40 calculates an input/output current target value based on the difference between a charging/discharging threshold value and the voltage of the DC bus, and controls the charging and discharging of the power storage device 41 by operating the power converter 42 such that the input/output current matches the input/output current target value.

For example, the power storage devices 31 and 41 may be batteries (secondary batteries), electric double layer capacitors, capacitors, flywheel diodes, redox flow batteries, or the like. The power converters 32 and 42 may be isolated DC/DC converters or choppers, for example, and can transmit and receive DC power bidirectionally as indicated by arrows.

In the sub stabilization device 50, a power converter 52 performs DC/DC conversion such that the input/output current matches the input/output current target value calculated based on the difference between a charging threshold value and the voltage of the DC bus, and supplies DC power to a water electrolysis cell 51 (a type of charging operation) to electrolyze water and thus generate hydrogen gas and oxygen gas. The sub stabilization device 60 supplies the DC power generated by the electrochemical reaction of a fuel cell 61 to the DC bus 70 via a power converter 62 (a type of discharging operation). At this time, the power converter 62 performs DC/DC conversion such that the input/output current matches the input/output current target value calculated based on the difference between a discharging threshold value and the voltage of the DC bus.

The configurations of the sub stabilization device 50 and the sub stabilization device 60 described above are merely examples. As an alternative to the water electrolysis cell 51, a means for electrochemically producing C—H bonds (e.g., $CH_4$, $C_2H_4$) or alcohol by performing carbon dioxide reduction, or a means for producing ammonia by reducing nitrogen may be used. As an alternative to the fuel cell 61, a fuel cell that uses alcohol or the like or a power generating means for rotating a turbine or the like by burning a chemical substance (e.g., hydrogen, CH, alcohol, ammonia) may also be used.

Figure 2:
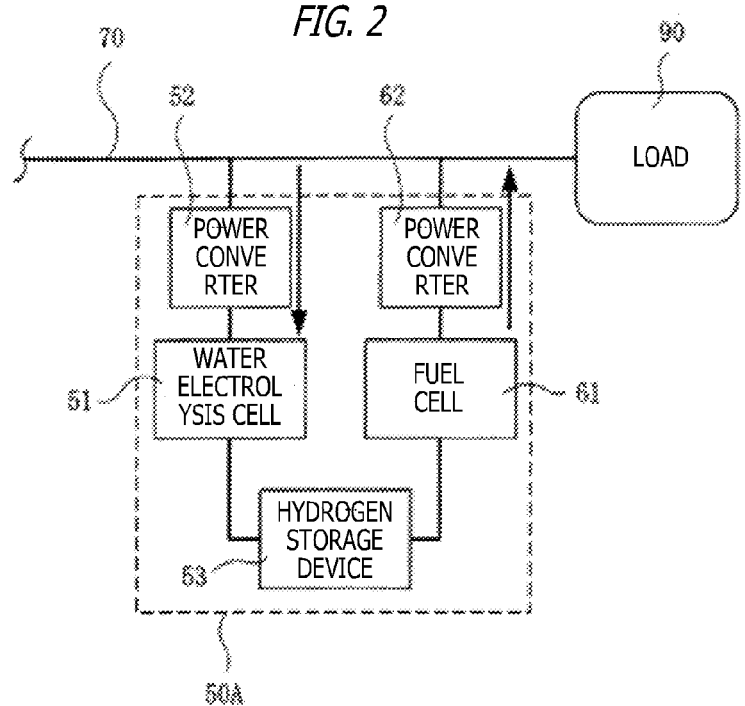
FIG. 2 is a block diagram showing another example of a sub stabilization device of an embodiment.

FIG. 2 is another configuration example of a sub stabilization device. As shown, the sub stabilization devices 50 and 60 described above may be an integral sub stabilization device 50A sharing a hydrogen storage device 53.

In FIG. 1, the power storage devices 31 and 41 are capable of absorbing (charging) and releasing (discharging) DC power. The water electrolysis cell 51 (and the hydrogen storage device 53 in FIG. 2) converts DC power into gas and stores it, and the fuel cell 61 (and similarly the hydrogen storage device 53) is capable of the power generation operation that converts gas into DC power. The power storage devices 31 and 41 constitute charging/discharging elements, the water electrolysis cell 51 (and the hydrogen storage device 53) constitutes a charging element, and the fuel cell 61 (and the hydrogen storage device 53) constitutes a discharging element.

As described above, the stabilization devices 30, 40, 50, and 60 may be considered as power buffers that transmit and receive DC power to and from the DC bus 70 through the operation of the power converters 32, 42, 52, and 62, respectively. Also, the main stabilization device 30 and the sub stabilization device 40 are power buffers with charging and discharging functions, the sub stabilization device 50 is a power buffer with a charging function, and the sub stabilization device 60 is a power buffer with a discharging function.

A single main stabilization device 30 having the function of setting the bus voltage target value may be provided, whereas a required number of the sub stabilization devices may be provided according to the number of power supply systems arranged in parallel or the power requirement of the load 90.

A monitoring/instructing device 80 collects state information (such as voltage, current, and temperature) of the power generation systems 10 and 20, the main stabilization device 30, and the sub stabilization devices 40, 50, and 60 to monitor the state and operation and also generates, based on the monitoring results, operation commands for portions (such as start/stop commands), charging/discharging threshold value commands, and the like. Various types of monitoring signals and commands can be transmitted and received between the monitoring/instructing device 80 and the aforementioned portions by wire or wirelessly.

The load 90 may be a DC load such as a DC motor, or a DC/AC converter that converts DC power to AC power and its AC load. Alternatively, an AC power system may be connected to the DC bus 70 via a DC/AC converter.

The configuration of the portions shown in FIG. 1 is now described. The configuration of FIG. 1 has the photovoltaic power generation system 10 and the wind power generation system 20 as input power sources.

The photovoltaic power generation system 10 and the wind power generation system 20 have a common function in that the power generated using renewable energy is converted into DC power by the power converters 12 and 22 and supplied to the DC bus 70. As such, the photovoltaic power generation system 10 is described below as an example.

Figure 3:
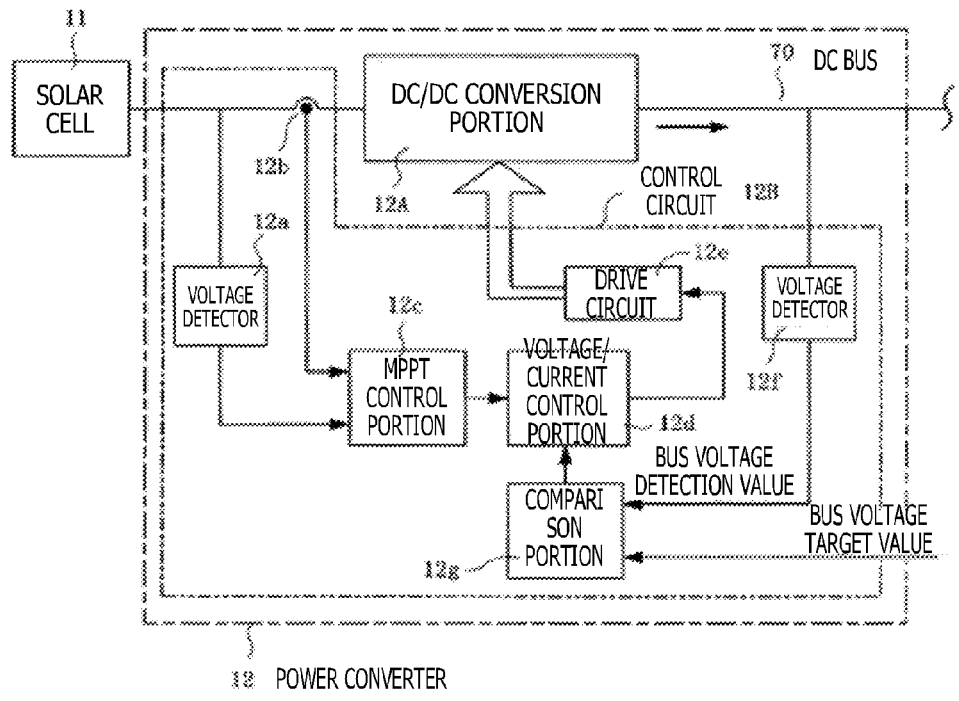
FIG. 3 is a block diagram showing a configuration example of a power converter in a photovoltaic power generation system.

FIG. 3 is a block diagram showing a configuration example of the power converter 12 in the photovoltaic power generation system 10. This power converter 12 includes a DC/DC conversion portion 12A and a control circuit 12B.

The DC/DC conversion portion 12A, which may be a boost chopper, for example, converts the DC output voltage of the solar cell 11 into a DC voltage of a predetermined magnitude by the operation of a semiconductor switching element, and outputs the DC voltage to the DC bus 70.

In the control circuit 12B, which controls the DC/DC conversion portion 12A, a voltage detector 12a and a current detector 12b detect the output voltage and current of the solar cell 11, and the detection values are input to an MPPT control portion 12c. The MPPT control portion 12c searches for the maximum output point of the solar cell 11 by a hill-climbing method or the like, and outputs it to a voltage/current control portion 12d.

The voltage/current control portion 12d sends a drive pulse generated by pulse width modulation (PWM) control or the like to a drive circuit 12e, and the drive circuit 12e turns on and off the semiconductor switching element of the DC/DC conversion portion 12A based on the drive pulse.

Also, a voltage detector 12f detects the voltage of the DC bus 70, and the bus voltage detection value is input to a comparison portion 12g together with a bus voltage target value sent from the main stabilization device 30, which will be described below. The comparison portion 12g generates a control signal according to the deviation between the bus voltage detection value and the bus voltage target value, and outputs the control signal to the voltage/current control portion 12d.

Based on the control signal, the voltage/current control portion 12d calculates a drive pulse that causes the bus voltage detection value to match the bus voltage target value. For example, when the bus voltage detection value exceeds the bus voltage target value, the voltage/current control portion 12d performs control operation (including stopping the operation) to lower the output voltage of the DC/DC conversion portion 12A.

Figure 4:
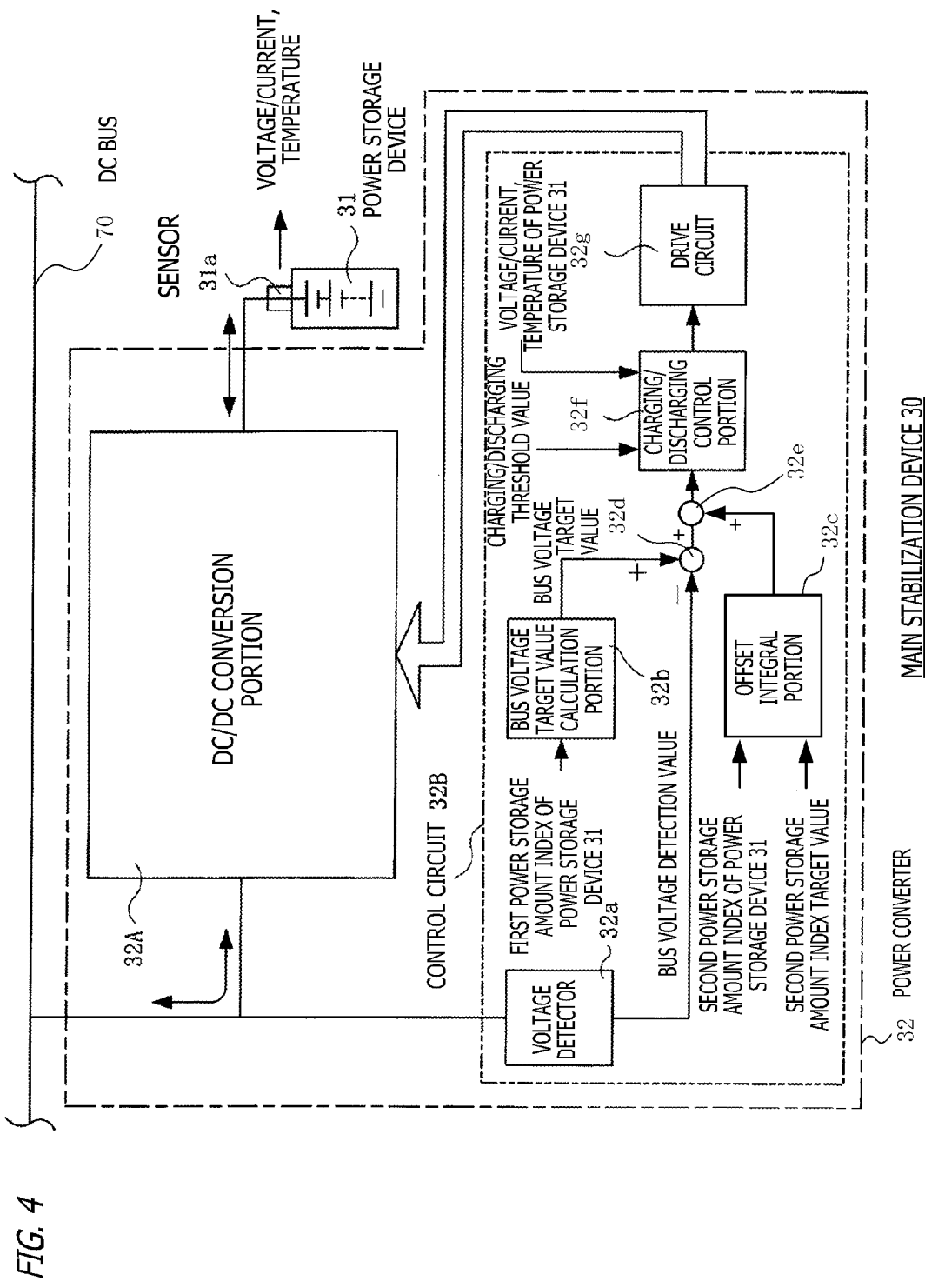
FIG. 4 is a block diagram showing a configuration example of a power converter in a main stabilization device.

FIG. 4 is a block diagram showing a configuration example of the power converter 32 in the main stabilization device 30. This power converter 32 includes a DC/DC conversion portion 32A and a control circuit 32B.

The DC/DC conversion portion 32A has the function of bidirectionally transmitting and receiving DC power between the DC bus 70 and the power storage device 31 to control the charging and discharging of the power storage device 31, and is formed by an isolated DC/DC converter or a chopper including a semiconductor switching element, for example. The power storage device 31 has a sensor 31a for detecting voltage/current and temperature.

The control circuit 32B is configured as follows.

A voltage detector 32a detects the voltage of the DC bus 70, and a bus voltage target value calculation portion 32b calculates a bus voltage target value according to a first power storage amount index of the power storage device 31. A method of calculating the bus voltage target value will be described below.

As the power storage amount index, a state of charge (SOC) may be used that is obtained by integrating the charging/discharging current of the power storage device 31 detected by the sensor 31a, for example.

An offset integral portion 32c calculates an offset of the bus voltage target value based on the difference between a second power storage amount index of the power storage device 31 and the target value of the second power storage amount index. The second power storage amount index is an index of the power storage amount of the power storage device 31 obtained by a method different from the first power storage amount index. For example, the terminal voltage (battery voltage) of the power storage device 31 detected by the sensor 31a may be used.

For example, the offset integral portion 32c obtains the above-described offset as a value according to the integral value of the difference between the second power storage amount index and its target value. More specifically, the offset is obtained as a value obtained by multiplying a value obtained by integrating the difference between the second power storage amount index and its target value by a predetermined gain.

Here, the integral calculation is not performed when the magnitude (absolute value) of the charging/discharging current of the power storage device 31 is greater than a predetermined value, and the integral calculation may be performed only when the magnitude of the charging/discharging current is less than the predetermined value. That is, the offset may be obtained as a value according to a value obtained by integrating the difference between the second power storage amount index and the target value of the power storage amount index, where the integration is performed only when the magnitude of the charging/discharging current of the power storage device 31 is less than a predetermined value. This predetermined value may be determined as a value that allows the second power storage amount index (e.g., terminal voltage) to accurately represent the power storage amount of the power storage device 31 when the magnitude of the charging/discharging current of the power storage device 31 is less than that value.

A subtractor 32d calculates the deviation between the bus voltage target value and the bus voltage detection value. A subtractor 32e further subtracts the offset from the voltage deviation, and the voltage deviation after the offset correction is input to the charging/discharging control portion 32f.

The voltage/current, temperature, and charging/discharging threshold value of the power storage device 31 are input to the charging/discharging control portion 32f. Taking the input information into account, the charging/discharging control portion 32f generates a drive pulse by performing PWM control or the like such that the bus voltage detection value matches the bus voltage target value. According to the drive pulse, a drive circuit 32g turns on and off the semiconductor switching element of the DC/DC conversion portion 32A. The DC/DC conversion portion 32A controls the charging and discharging of the power storage device 31 as described above such that the bus voltage detection value matches the bus voltage target value.

In general, the power storage amount of the power storage device 31 can be roughly estimated based on the terminal voltage. The terminal voltage varies depending on the magnitude of the charging/discharging current, but when the charging/discharging current is sufficiently small (not more than the above predetermined value), the terminal voltage may be considered as representing the power storage amount of the power storage device 31. As such, by performing integral operation of the difference between the terminal voltage and its target value only when the charging/discharging current is small, it is possible to steadily remove the offset of the power storage index in the same manner as the integral control of the PID control. That is, the power storage amount of the power storage device 31 can be maintained at the target value of the second power storage amount index, and continuous operation can be performed stably for the long term without causing the depletion or overflow of the actual power storage amount of the power storage device 31.

The charging/discharging threshold value of the power storage device 31 may be set by the control circuit 32B itself, or may be received as a command from the monitoring/instructing device 80 in FIG. 1.

Figure 5:
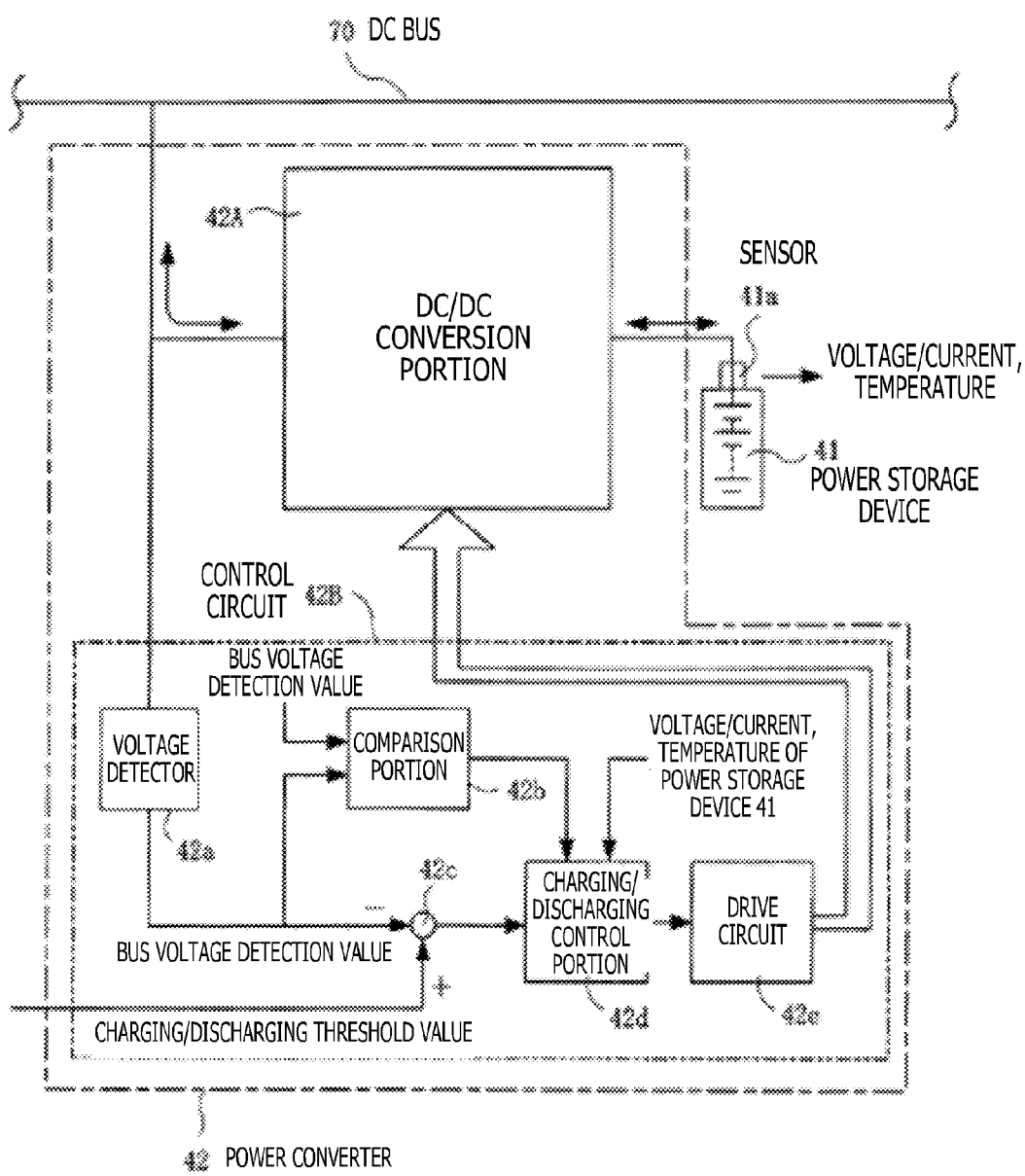
FIG. 5 is a block diagram showing a configuration example of a power converter in a sub stabilization device.

FIG. 5 is a block diagram showing a configuration example of the power converter 42 in the sub stabilization device 40 in FIG. 1. This power converter 42 includes a DC/DC conversion portion 42A and a control circuit 42B. The power converter 42 has the same function as the power converter 32 in FIG. 4 in that the power converter 42 bidirectionally transmits and receives DC power between the DC bus 70 and the power storage device 41. As the power storage device 31, the power storage device 41 has a sensor 41a for detecting voltage/current and temperature. The control circuit 42B includes a voltage detector 42a, a comparison portion 42b, a subtractor 42c, a charging/discharging control portion 42d, and a drive circuit 42e.

The power converter 42 shown in FIG. 5 differs from the power converter 32 shown in FIG. 4 in the following points. In the control circuit 42B, the charging/discharging control portion dad calculates an input/output current target value based on the deviation between a charging/discharging threshold value and the bus voltage detection value. The charging/discharging control portion 42d also performs charging/discharging control for the power storage device 41 such that the input/output current of the DC/DC conversion portion 42A matches the input/output current target value. The above charging/discharging threshold value may be a threshold value (charging threshold value and discharging threshold value) regarding the charging/discharging of the power storage device 41, and the input/output current target value may be set according to the difference between the threshold value and the voltage of the DC bus 70.

Furthermore, the comparison portion 42b provided in the control circuit 42B compares the charging/discharging threshold value of the power storage device 41 with the bus voltage detection value, and outputs a charging command or a discharging command according to the magnitude relationship between the charging threshold value or the discharging threshold value and the bus voltage detection value to control the operation of the charging/discharging control portion 42d. The charging/discharging threshold value may be set by the control circuit 42B itself, or may be received as a command from the monitoring/instructing device 80.

Figure 6:
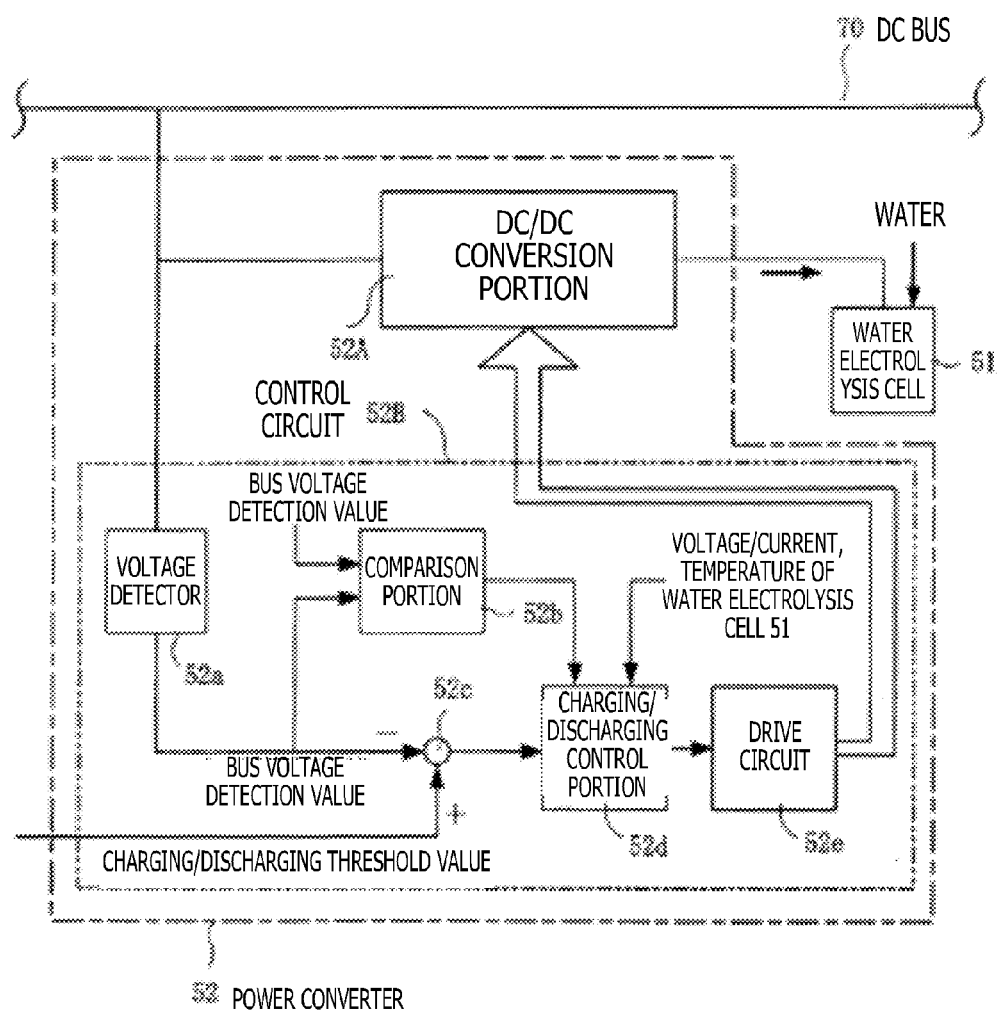
FIG. 6 is a block diagram showing a configuration example of a power converter in a sub stabilization device.

FIG. 6 is a block diagram showing a configuration example of the power converter 52 in the sub stabilization device 50. This power converter 52 includes a DC/DC conversion portion 52A and a control circuit 52B.

The DC/DC conversion portion 52A has the function of converting the DC power of the DC bus 70 into a predetermined magnitude and supplying it to the water electrolysis cell 51, and is formed by an isolated DC/DC converter or chopper including a semiconductor switching element. The water electrolysis cell 51 electrolyzes water using the DC power supplied from the DC/DC conversion portion 52A, and performs the operation of storing the generated hydrogen gas in an external storage device (not shown), in other words, one type of charging operation.

The control circuit 52B for controlling the DC/DC conversion portion 52A is configured in substantially the same manner as the control circuit 42B in FIG. 5.

That is, in the control circuit 52B of FIG. 6, a voltage detector 52a detects the voltage of the DC bus 70, a subtractor 52c calculates the deviation between a charging threshold value and the bus voltage detection value, and this voltage deviation is input to a charging control portion 52d. The bus voltage detection value is input to a comparison portion 52b together with a charging threshold value, and the comparison portion 52b outputs a charging command to the charging control portion 52d when the bus voltage detection value exceeds the charging threshold value. This charging threshold value corresponds to the start voltage of electrolysis by the water electrolysis cell 51. That is, the charging threshold value is a threshold value regarding the charging of the water electrolysis cell 51.

The charging control portion 52d calculates the input/output current target value based on the voltage deviation input from the subtractor 52c, generates a drive pulse as a charging command such that the input/output current of the DC/DC conversion portion 52A matches the input/output current target value, and outputs the drive pulse to the drive circuit 52e. The drive circuit 52e turns on and off the semiconductor switching element of the DC/DC conversion portion 52A according to the drive pulse, thereby supplying DC power to the water electrolysis cell 51 to electrolyze water.

The DC/DC conversion portion 52A operates to match the input/output current with the input/output current target value while controlling the DC power supplied to the water electrolysis cell 51 by the above operation.

As for the sub stabilization device 60 in FIG. 1, the power generation operation by the fuel cell 61 may be considered as a discharging operation. The sub stabilization device 60 may be configured by replacing the water electrolysis cell 51, the charging threshold value, and the charging control portion 52d of the sub stabilization device 50 shown in FIG. 6 with the fuel cell 61, the discharging threshold value, and the discharging control portion, respectively. In this case, the discharging threshold value corresponds to the starting voltage for power generation by the fuel cell 61.

With the sub stabilization device 60, when the bus voltage detection value falls below the discharging threshold value, a drive pulse serving as a discharging command is output to the discharging control portion to operate the DC/DC conversion portion, and the power generated by the fuel cell 61 is supplied to the DC bus 70 via the DC/DC conversion portion.

The DC/DC conversion portion operates to match the input/output current with the input/output current target value while controlling the power generated by the fuel cell 61 through the above operation.

The water electrolysis cell 51 and the fuel cell 61 also have sensors for detecting voltage/current, temperature, and the like, and the detection values are input to the charging control portion 52d and the discharging control portion. These sensors are not shown for the sake of convenience.

The charging threshold value and the discharging threshold value may be set by each control circuit itself, or may be received as a command from the monitoring/instructing device 80.

The configurations and operations of the power converters 12, 32, 42, and 52, particularly the control circuits 12B, 32B, 42B, and 52B shown in FIGS. 3 to 6 are merely illustrative and do not limit the technical scope of the present invention. It is obvious that configurations different from the above may be adopted.

Figure 7A:
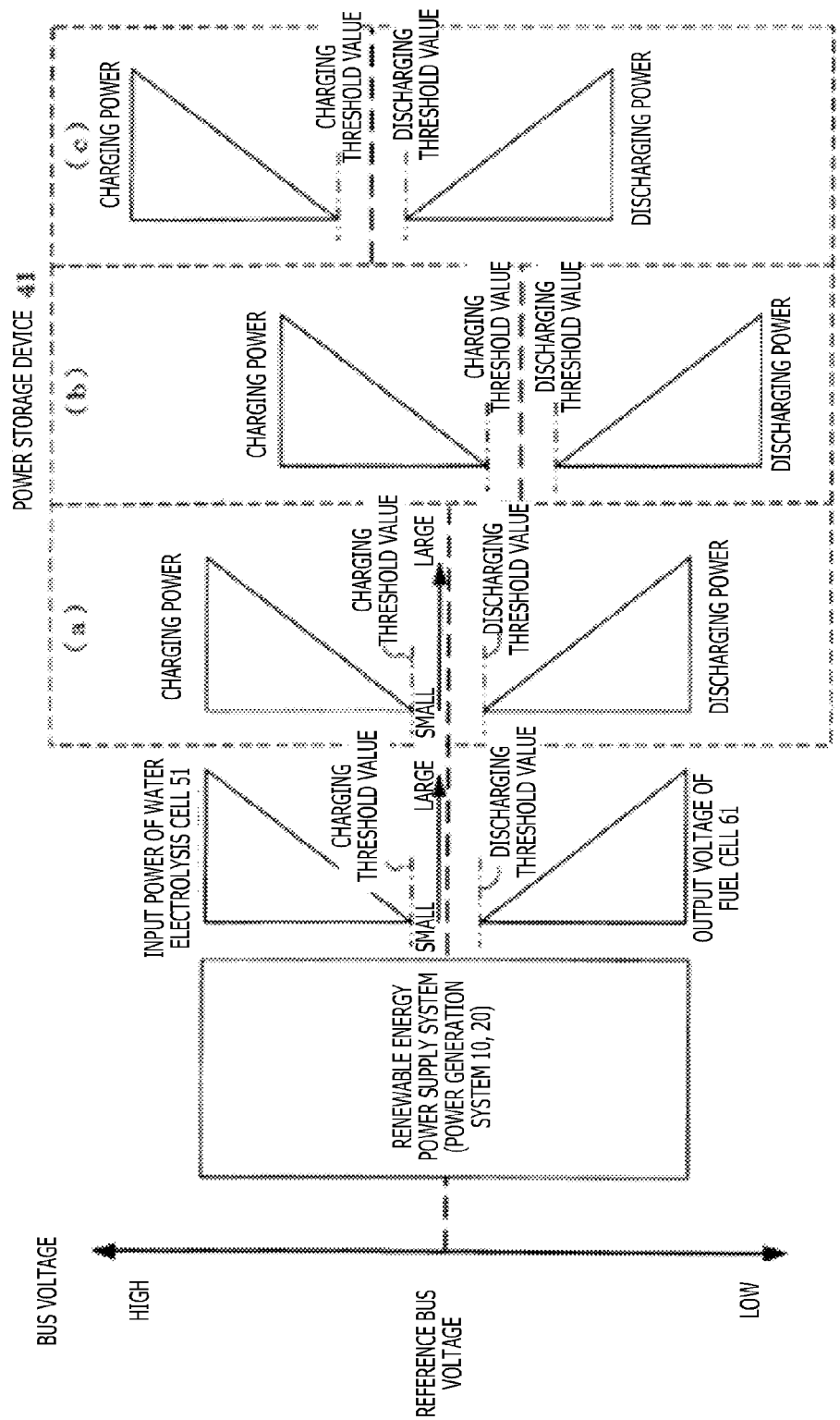
FIG. 7A is a conceptual diagram schematically showing the relationship between the charging/discharging power of a power storage device, the input power of a water electrolysis cell, the output power of a fuel cell, and the like and bus voltage.

FIG. 7A is a conceptual diagram schematically showing the charging/discharging power of the power storage device 41 of the sub stabilization device 40, the input power of the water electrolysis cell 51 of the sub stabilization device 50, and the output power of the fuel cell 61 of the sub stabilization device 60 according to the voltage of the DC bus 70. The lateral width of each triangular symbol in FIG. 7A represents the magnitude of each power, and a larger width represents a higher power value.

FIG. 7A illustrates a case in which the input power source is a renewable energy power supply system, and the renewable energy power supply system may be the photovoltaic power generation system 10 and/or the wind power generation system 20 in FIG. 1, for example. The charging/discharging operation of each portion is controlled according to the voltage of the DC bus 70 to which the generated power is supplied and the charging/discharging threshold values or the like of the power storage device 41, the water electrolysis cell 51, and the fuel cell 61.

For example, as shown in the portion (a) for the power storage device 41, a higher bus voltage above the charging threshold value of the power storage device 41 increases the charging power supplied to the power storage device 41, and a lower bus voltage below the discharging threshold value of the power storage device 41 increases the discharging power released from the power storage device 41. Similarly, a higher bus voltage above the charging threshold value of the water electrolysis cell 51 increases the charging power supplied to the water electrolysis cell 51, and a lower bus voltage below the discharging threshold value of the fuel cell 61 increases the discharging power generated by the fuel cell 61.

The portion (b) for the power storage device 41 represents a case in which the charging threshold value and discharging threshold value are set lower than (a) according to the reference bus voltage, and the portion (c) represents a case in which the charging threshold value and discharging threshold value are set higher than (a). A similar threshold value setting change operation is also possible for the charging threshold value of the water electrolysis cell 51 and the discharging threshold value of the fuel cell 61.

In this manner, by changing the charging threshold value and discharging threshold value of the power storage device 41, the water electrolysis cell 51, and the fuel cell 61 to control the charge/discharging operation, the DC power transmitted and received between the DC bus 70 and the sub stabilization devices 40, 50, and 60 may be individually adjusted. In other words, it is possible to finely control the operations of the devices as power buffers.

As described above, the charging threshold value and the discharging threshold value can be changed based on commands from the monitoring/instructing device 80 or by the power converters 42, 52, and 62 themselves.

Figure 8A:
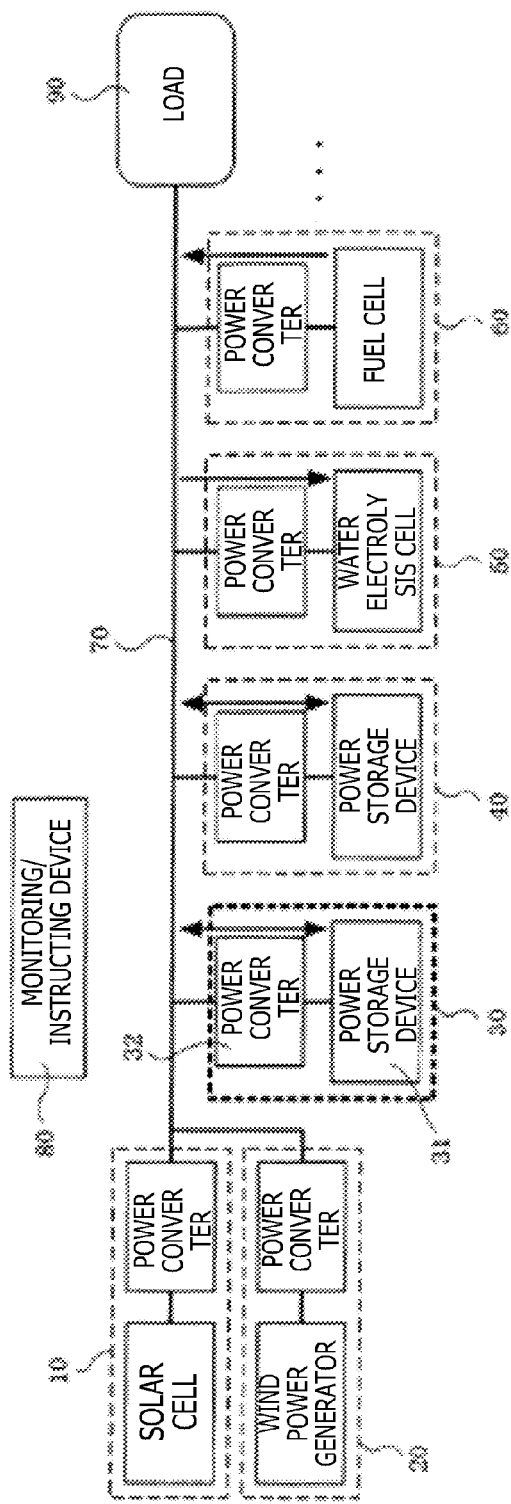
FIG. 8A is an explanatory diagram of the operation of a main stabilization device.
Figure 8B:
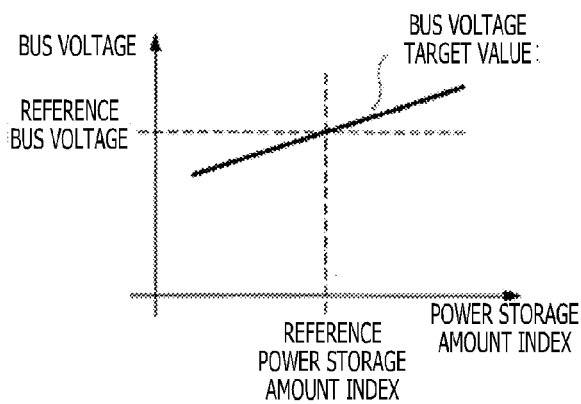
FIG. 8B is an explanatory diagram of the operation of the main stabilization device.

FIGS. 8A and 8B are explanatory diagrams of the operation of the main stabilization device 30.

As indicated by a broken line (bold line) in FIG. 8A, the main stabilization device 30 transmits and receives DC power between the DC bus 70 and the power storage device 31 to control the charging and discharging of the power storage device 31. The control circuit 32B in the power converter 32 sets the bus voltage target value based on the first power storage amount index (e.g., the state of charge) of the power storage device 31 according to the characteristics shown in FIG. 8B, for example.

This bus voltage target value may be set to be higher when the first power storage amount index is larger and lower when the first power storage amount index is smaller within the allowable range of the voltage of the DC bus 70. The control circuit 32B controls the DC/DC conversion portion 32A such that the bus voltage detection value matches the bus voltage target value.

Alternatively, an upper limit and a lower limit may be set for the bus voltage target value. The upper limit may be a value corresponding to the maximum charging operation of the water electrolysis cell or battery (a value instructing the maximum operation) or a value slightly higher than this value. The lower limit may be a value corresponding to the maximum discharging operation of the fuel cell or battery (a value instructing the maximum operation) or a value slightly lower than this value.

Figure 8C:
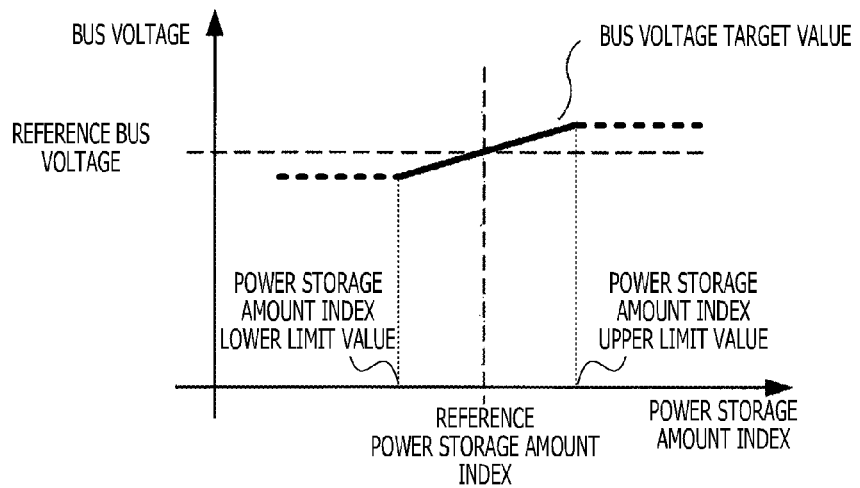
FIG. 8C is an explanatory diagram of the operation of the main stabilization device.

When upper and lower limits are set for the bus voltage target value, the relationship between the first power storage amount index and the target value determined by the bus voltage target value calculation portion 32b is as shown in FIG. 8C. Since the first power storage amount index only takes values between the lower limit value and the upper limit value, the bus voltage target value also takes values corresponding to this range. By setting an upper limit of the first power storage amount index, even if the generated power is excessive, the system can be returned to a normal state in a relatively short time after the situation is resolved. When the load power is excessive, the presence of the lower limit of the first power storage amount index has the same advantageous effect as above.

When the generated power or the load power is excessive, there is a difference between the first power storage amount index (value obtained by calculation and used for control) and the actual power storage amount of the power storage device 31. However, in the DC bus control system according to the present embodiment, the main stabilization device 30 uses the offset integral portion 32c to determine the bus voltage target value by taking into account the integral value of the difference between the second power storage amount index (battery voltage) and its target value. Thus, the difference between the calculated power storage amount index (first power storage amount index) and the actual power storage amount as described above can be automatically eliminated in the long term.

Figure 9A:
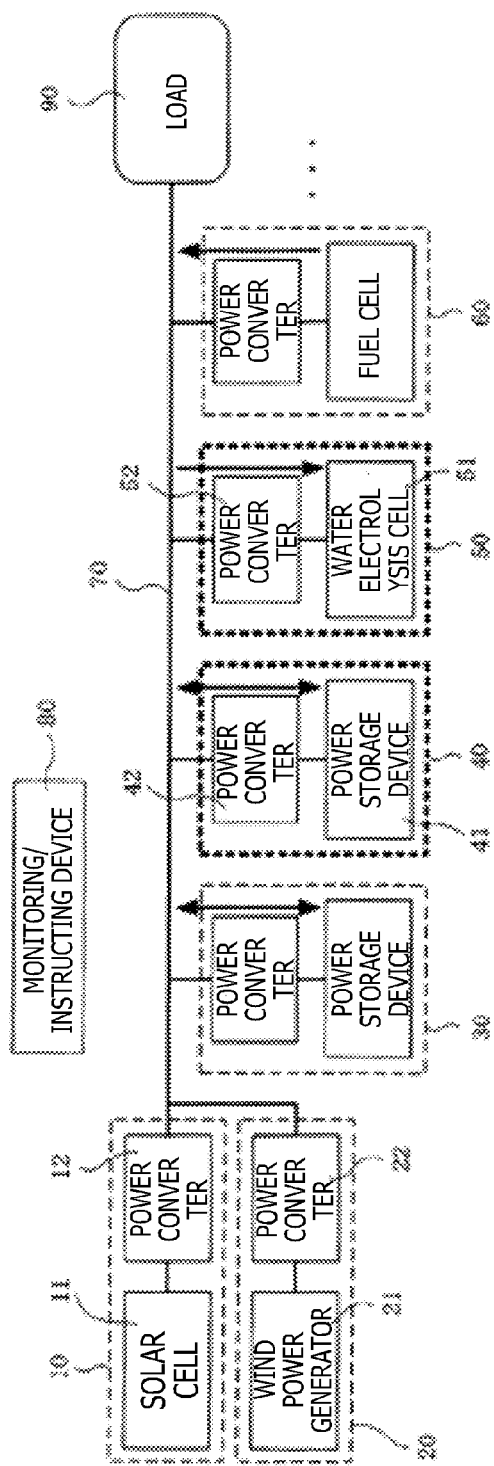
FIG. 9A is an explanatory diagram of the operation of a sub stabilization device.
Figure 9B:
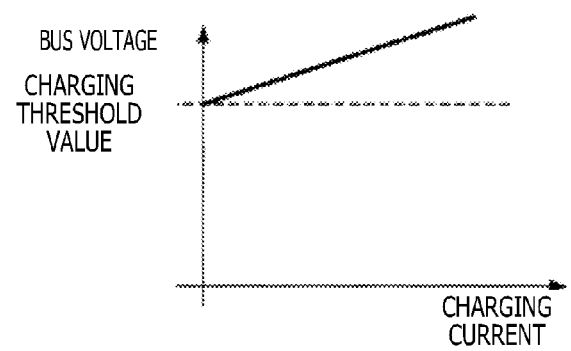
FIG. 9B is an explanatory diagram of the operation of the sub stabilization device.

FIGS. 9A and 9B are explanatory diagrams of the operation of the sub stabilization devices 40 and 50.

As indicated by broken lines (broken lines) in FIG. 9A, the power converter 42 of the sub stabilization device 40 uses DC power from the DC bus 70 to charge the power storage device 41, and the power converter 52 of the sub stabilization device 50 supplies the DC power of the DC bus 70 to the water electrolysis cell 51 to electrolyze water.

The charging characteristics in this situation are as shown in FIG. 9B, and the power converters 42 and 52 are controlled such that a higher voltage of the DC bus 70 above the charging threshold value of the power storage device 41 or the water electrolysis cell 51 increases the charging current.

Figure 10A:
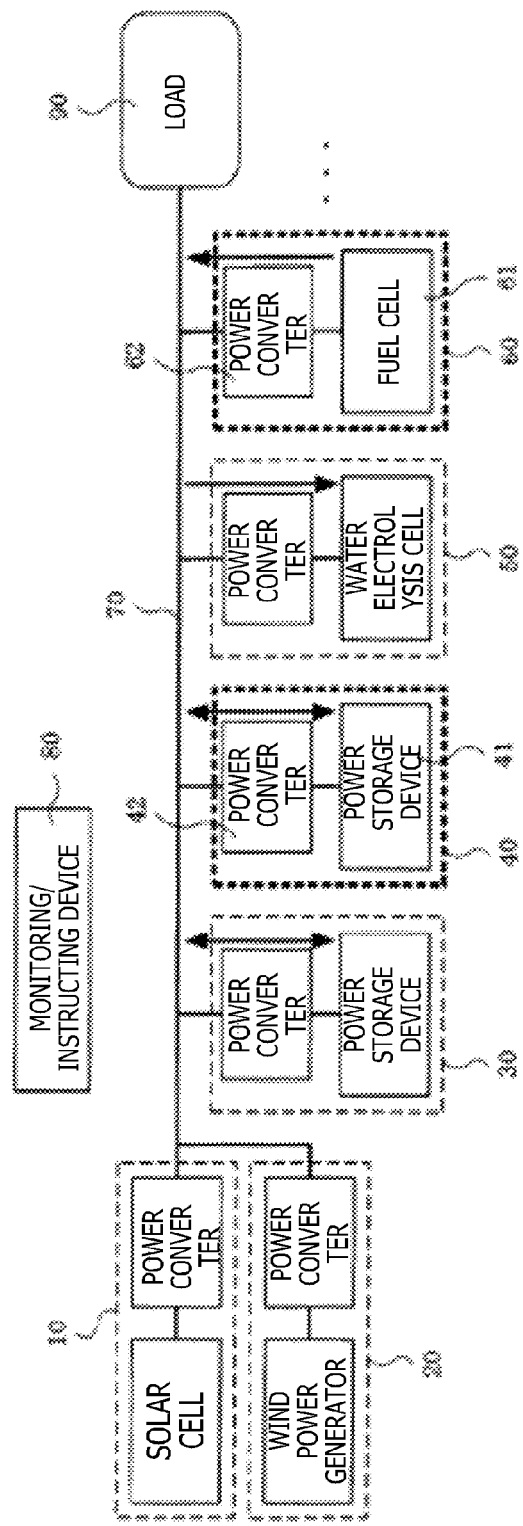
FIG. 10A is an explanatory diagram of the operation of a sub stabilization device.
Figure 10B:
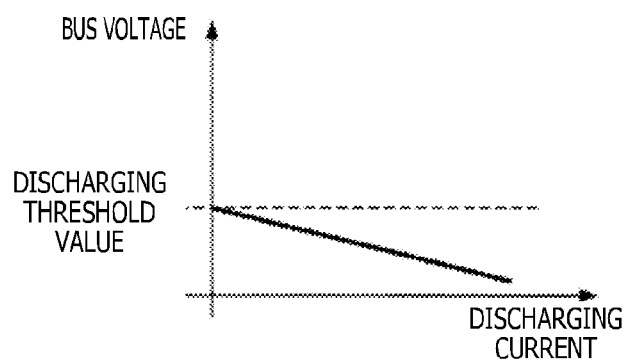
FIG. 10B is an explanatory diagram of the operation of the sub stabilization device.

FIGS. 10A and 10B are explanatory diagrams of the operation of the sub stabilization devices 40 and 60.

As indicated by a broken line (bold line) in FIG. 10A, the power converter 42 of the sub stabilization device 40 causes the power storage device 41 to discharge and supplies the DC power to the DC bus 70. The power converter 62 of the sub stabilization device 60 causes the fuel cell 61 to generate power and supplies the DC power to the DC bus 70.

The discharging characteristics in this situation are as shown in FIG. 10B, and the power converters 42 and 62 are controlled such that a lower voltage of the DC bus 70 below the discharging threshold value of the power storage device 41 or the fuel cell 61 increases the discharging current.

The DC bus control system according to the present embodiment reacts to changes in the power input/output balance of the entire system by first inputting/outputting current to the main stabilization device 30 (power storage device 31) with a fast response speed so as to ease the response to other devices. At this time, when a current flows into the main stabilization device 30, the charging of the power storage device 31 increases the first power storage amount index, thereby increasing the bus voltage. Conversely, when a current flows out from the main stabilization device 30, the discharging of the power storage device 31 reduces the first power storage amount index, thereby lowering the bus voltage. The power converter 32 of the main stabilization device 30 (the DC/DC conversion portion 32A and the control circuit 32B) perform these operations.

As for a sub stabilization devices, charging or discharging is performed by increasing or decreasing the amount of current flowing into the charging element or the discharging element according to the fluctuation of the bus voltage. The power converter of the sub stabilization device performs this operation.

A series of these operations is performed such that the current input/output to the main stabilization device 30 becomes zero, and controlled such that the total current input/output to the entire system eventually becomes zero. Thus, at a given DC bus voltage, a steady state is reached when the current flowing in and out of the sub stabilization device becomes a constant value.

According to the present embodiment, since the operation of each device is performed in an analog manner using the voltage of the DC bus line as a signal, system control can be performed through the distributed processing by the operation of each device, eliminating the need for centralized overall control. As a result, the issue of errors that cause problems when centralized management is performed is solved. The main stabilization device needs to have a reaction speed that follows the power fluctuations of the system. In contrast, the operation of a sub stabilization device may be relatively slow without causing any problems because the main stabilization device absorbs rapid fluctuations. Also, the direction of the current of the sub stabilization device is controllable. This allows for the use of devices that can absorb or release power only in one direction and are not suitable for high-speed output fluctuations, such as water electrolysis cells and fuel cells. Furthermore, a plurality of devices can be used as sub stabilization devices by changing the setting of the operating voltage threshold value of these devices and the current inflow/outflow ratio with respect to the DC bus voltage. Also, since the operating signal for each device is DC bus voltage, it is relatively easy to increase and decrease the number of the sub stabilization devices.

Furthermore, according to the present embodiment, the main stabilization device 30 determines the target value of the DC bus voltage based on the second power storage amount index of the power storage device 31, so that the power storage amount of the power storage device 31 is maintained constant, allowing for stable, long-term continuous operation.

<Configuration for Longer Life>

A configuration for preventing deterioration of the water electrolysis cell 51 and the fuel cell 61 and achieving long-term continuous operation is now described.

To prevent deterioration of the water electrolysis cell 51 and the fuel cell 61, it is important to avoid sudden power fluctuations and operation with excessively large or small power. More specifically, voltage application control is preferably performed for each single cell of the water electrolysis cell 51 such that the maximum voltage is 3 V (more preferably, maximum of 2.5 V and rating of 2.0 V) and the time from zero to the rating is 30 seconds or more (more preferably 60 seconds or more, and yet more preferably 5 minutes or more) so as not to change the voltage more rapidly than the above. Also, load control is preferably performed for each single cell of the fuel cell 61 such that the voltage is 0.8 V or less and 0.6 V or more, the load is always 15% or more (the fuel cell is stopped when a state in which the load is 15% or less continues for 5 minutes or more), and the time from zero to the rating is 30 seconds or more (more preferably 60 seconds or more, and yet more preferably 5 minutes or more) so that the voltage fluctuations are within the range of 0.7 V to 0.8 V in one second or longer.

To this end, the present embodiment controls the time constants of the water electrolysis cell 51 and the fuel cell 61 and the maximum power (current) or minimum power (current) as follows.

Figure 7B:
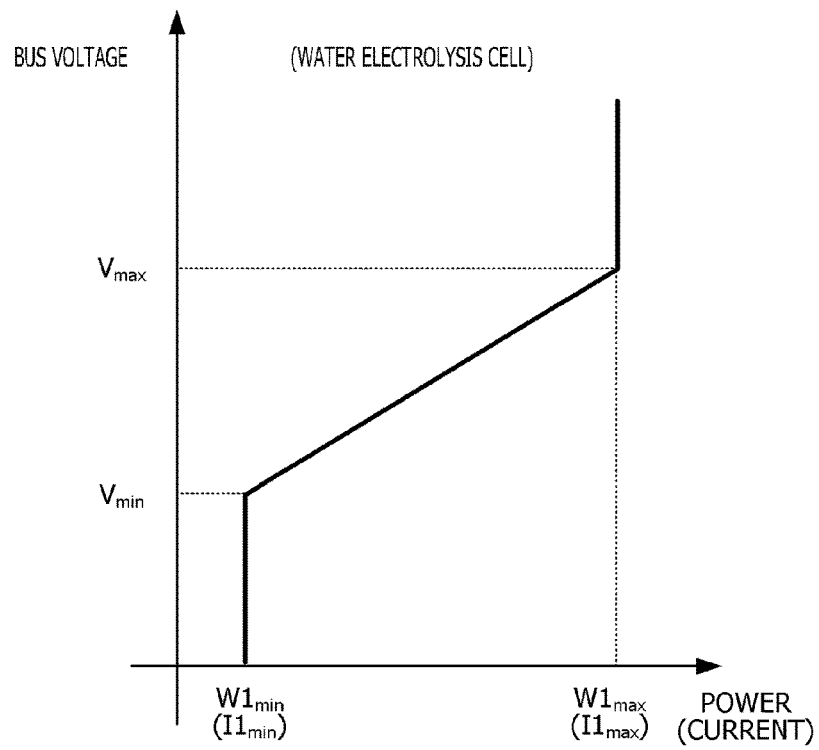
FIG. 7B is a diagram illustrating the relationship between bus voltage and generated power (current) in a water electrolysis cell.

FIG. 7B is a diagram showing the relationship between the bus voltage and the power (current) in the water electrolysis cell 51. The water electrolysis cell 51 has a constant predetermined power $W1_{min}$ (current $I1_{min}$) while the bus voltage is between 0 and the first threshold value $V_{min}$. The power (current) gradually increases while the bus voltage is between the first threshold value $V_{min}$ and the second threshold value $V_{max}$, and is constant at power $W1_{max}$ (current $I1_{max}$) when the bus voltage is the second threshold value $V_{max}$ or more. The threshold values $V_{min}$, $V_{max}$ and electric power $W1_{min}$, $W1_{max}$ (current $I1_{min}$, $I1_{max}$) can be set based on a command from monitoring/instructing device 80 or by the power converter 52.

The time constant of such response of the water electrolysis cell 51 is given as follows.

$$\tau 1 = \frac{V1_{max} - V1_{min}}{K_{p1} I1_{max}} \quad \text{[Math. 1]}$$

Here, $I1_{max}$ is a current corresponding to the upper limit value set for the first power storage amount index. The proportional gain $K_p$ is the ratio for conversion of the bus voltage and the sub stabilization device current and can be set by the power converter 52.

Figure 7C:
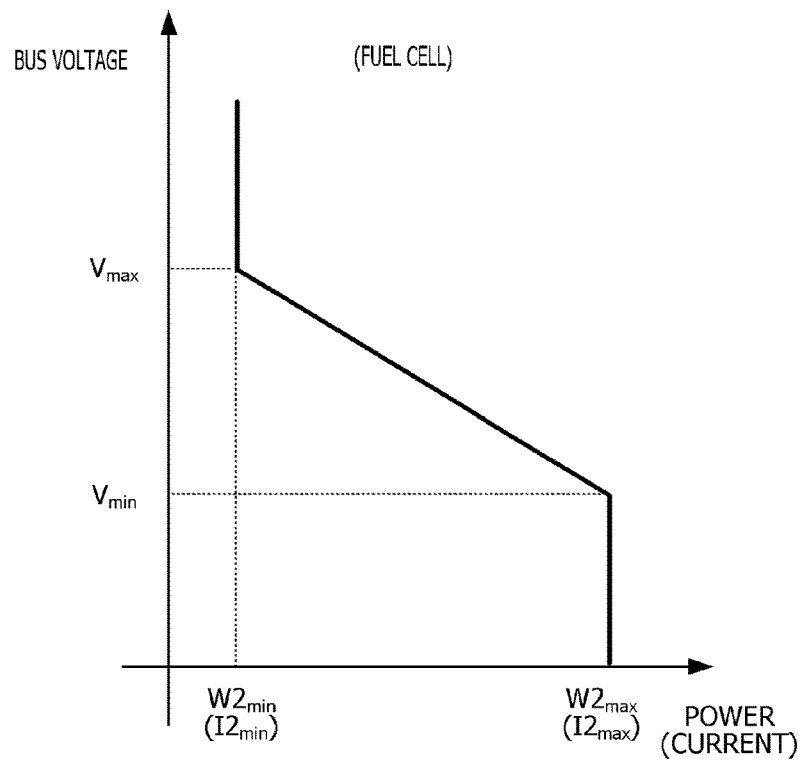
FIG. 7C is a diagram illustrating the relationship between bus voltage and generated power (current) in a fuel cell.

Similarly, FIG. 7C is a diagram showing the relationship between the bus voltage and the power (current) in the fuel cell 61. The fuel cell 61 has a constant predetermined power $W2_{max}$ (current $I2_{max}$) while the bus voltage is between 0 and the first threshold value $V_{min}$. The power (current) gradually decreases while the bus voltage is between the first threshold value $V_{min}$ and the second threshold value $V_{max}$, and is constant at $W2_{min}$ (current $I2_{min}$) when the bus voltage is the second threshold value $V_{max}$ or more. The threshold values $V_{min}$, $V_{max}$ and the power $W2_{min}$, $W2_{max}$ (current $I2_{min}$, $I2_{max}$) can be set based on a command from monitoring/instructing device 80 or by the power converter 62.

The time constant for the fuel cell is also given as follows and can be set in the same manner as the water electrolysis cell 51.

$$\tau 2 = \frac{V2_{max} - V2_{min}}{K_{p2}I2_{max}} \quad \text{[Math. 2]}$$

The power storage device 41 of the sub stabilization device 40 is a power storage device capable of bidirectionally transmitting and receiving DC power, such as a supercapacitor, and its time constant is substantially equal to the time constant of the power storage device 31 of the main stabilization device 30. As used in this disclosure, "substantially equal" refers to that one is within plus or minus 30 percent of the other, but it may also be plus or minus 10 percent or plus or minus 3 percent.

The presence of the power storage device 41 with substantially the same time constant as the power storage device 31 of the main stabilization device 30 allows the water electrolysis cell 51 and the fuel cell 61 to respond with the time constants described above. Here, the maximum current, minimum current, and gain are set such that the time for the water electrolysis cell 51 and the fuel cell to reach the rated voltage from the minimum voltage is 30 seconds or more, more preferably 60 seconds or more and yet more preferably 5 minutes or more. This limits the deterioration of the water electrolysis cell 51 and the fuel cell 61, allowing for stable long-term operation.

In the above description, an example that includes only one sub stabilization device having a charging/discharging element has been described, but there may be a plurality of the sub stabilization devices each having a charging/discharging element. For example, there may be a sub stabilization device 40A having a power storage device (charging/discharging element) with a time constant substantially the same as that of the power storage device 31 of the main stabilization device 30, and a sub stabilization device 40B having a time constant less than that of the power storage device 31 of the main stabilization device 30. For example, a supercapacitor may be used for the sub stabilization device 40A, and a secondary battery may be used for the sub stabilization device 40B. The use of a plurality of the sub stabilization devices with different time constants further simplifies the control of the time constants of the water electrolysis cell 51 and the fuel cell 61.

In the above example, the sub stabilization device 40A corresponds to the first sub stabilization device, the sub stabilization devices 50 and 60 correspond to the second sub stabilization devices, and the sub stabilization device 40B corresponds to the third sub stabilization device.

REFERENCE SIGNS LIST

10 Photovoltaic power generation system
11 Solar cell
12 Power converter
12A DC/DC conversion portion
12B Control circuit
12a, 12f Voltage detector
12b Current detector
12c MPPT control portion
12d Voltage/current control portion
12e Drive circuit
12g Comparison portion
20 Wind power generation system
21 Wind power generator
22 Power converter
30 Main stabilization device
31 Power storage device
31a Sensor
32 Power converter
32A DC/DC conversion portion
32B Control circuit
32a Voltage detector
32b Bus voltage target value calculation portion
32c Offset integral portion
32d Subtractor
32e Subtractor
32f Charging/discharging control portion
32g Drive circuit
40 Sub stabilization device
41 Power storage device
41a Sensor
42 Power converter
42A DC/DC conversion portion
42B Control circuit
42a Voltage detector
42b Comparison portion
42c Subtractor
42d Charging/discharging control portion
42e Drive circuit
50, 50A Sub stabilization device
51 Water electrolysis cell
52 Power converter
52A DC/DC conversion portion
52B Control circuit
52a Voltage detector
52b Comparison portion
52c Subtractor
52d Charging control portion
52e Drive circuit
53 Hydrogen storage device
60 Sub stabilization device
61 Fuel cell
62 Power converter
70 DC bus
80 Monitoring/instructing device
90 Load

The invention claimed is:

1. A DC bus control system for controlling power fluctuations in a DC bus connecting an input power source and a load, the DC bus control system comprising:
a main stabilization device including a first charging/discharging element and a first power converter;
a plurality of the sub stabilization devices each including a second charging/discharging element, a charging element, or a discharging element and a second power converter, wherein
the first power converter is configured to obtain a bus voltage target value and transmit and receive DC power bidirectionally between the first charging/discharging element and the DC bus such that a voltage of the DC bus matches the bus voltage target value,
the second power converter is configured to obtain a current target value according to a difference between a threshold value regarding charging or discharging of the second charging/discharging element, the charging element or the discharging element and the voltage of the DC bus, and to transmit and receive DC power between the second charging/discharging element, the charging element or the discharging element, and the DC bus such that a current equal to the current target value flows to the second charging/discharging element, the charging element or the discharging element, the plurality of the sub stabilization devices includes a first sub stabilization device having a charging/discharging element and a second power converter and at least one second sub stabilization device having a charging element or a discharging element and a second power converter, a response speed of the first sub stabilization device is set such that a charging amount of the charging element or a discharging amount of the discharging element of the second sub stabilization device changes with a predetermined time constant, and the first charging/discharging element of the main stabilization device and the second charging/discharging element of the first sub stabilization device are substantially equal in time constant.

2. The DC bus control system according to claim 1, wherein the predetermined time constant is a time of 30 seconds or more for reaching a rated voltage from a minimum voltage.

3. The DC bus control system according to claim 1, wherein the predetermined time constant is a time of 60 seconds or more for reaching a rated voltage from a minimum voltage.

4. The DC bus control system according to claim 1, wherein both the first charging/discharging element of the main stabilization device and the charging/discharging element of the first sub stabilization device are capacitors.

5. The DC bus control system according to claim 4, wherein
the plurality of the sub stabilization devices further includes a third sub stabilization device having a charging/discharging element and a second power converter, and
the charging/discharging element of the first sub stabilization device and the charging/discharging element of the third sub stabilization device differ in time constant.

6. The DC bus control system according to claim 1, wherein the first power converter obtains the bus voltage target value by subtracting an offset according to a second power storage amount index that is obtained in a manner, which differs from a first power storage amount index of the first charging/discharging element, from a target value according to the first power storage amount index of the first charging/discharging element.

7. The DC bus control system according to claim 6, wherein
the second power storage amount index is a terminal voltage of the first charging/discharging element, and
the offset is a value according to an integral value of a difference between the second power storage amount index and a target value of the second power storage amount index.

8. The DC bus control system according to claim 7, wherein the offset is a value according to a value obtained by integrating the difference between the second power storage amount index and the target value of the second power storage amount index only when a magnitude of a charging/discharging current of the first charging/discharging element is less than a predetermined value.

9. The DC bus control system according to claim 6, wherein
the first power storage amount index is a value obtained by integrating a charging/discharging current of the first charging/discharging element, and
a predetermined upper limit and lower limit are set for the first power storage amount index.

10. The DC bus control system according to claim 9, wherein
the upper limit is a value corresponding to a maximum charging operation of the second charging/discharging element or the charging element, and
the lower limit is a value corresponding to a maximum discharging operation of the second charging/discharging element or the discharging element.

11. A DC bus control system for controlling power fluctuations in a DC bus connecting an input power source and a load, the DC bus control system comprising:
a main stabilization device including a first charging/discharging element and a first power converter;
a plurality of the sub stabilization devices each including a second charging/discharging element, a charging element, or a discharging element and a second power converter, wherein
the first power converter is configured to obtain a bus voltage target value and transmit and receive DC power bidirectionally between the first charging/discharging element and the DC bus such that a voltage of the DC bus matches the bus voltage target value,
the second power converter is configured to obtain a current target value according to a difference between a threshold value regarding charging or discharging of the second charging/discharging element, the charging element or the discharging element and the voltage of the DC bus, and to transmit and receive DC power between the second charging/discharging element, the charging element or the discharging element, and the DC bus such that a current equal to the current target value flows to the second charging/discharging element, the charging element or the discharging element,
the first power converter obtains the bus voltage target value by subtracting an offset according to a second power storage amount index that is obtained in a manner, which differs from a first power storage amount index of the first charging/discharging element, from a target value according to the first power storage amount index of the first charging/discharging element,
the second power storage amount index is a terminal voltage of the first charging/discharging element, and
the offset is a value according to an integral value of a difference between the second power storage amount index and a target value of the second power storage amount index.

12. The DC bus control system according to claim 11, wherein the offset is a value according to a value obtained by integrating the difference between the second power storage amount index and the target value of the second power storage amount index only when a magnitude of a charging/discharging current of the first charging/discharging element is less than a predetermined value.

13. The DC bus control system according to claim 11, wherein
the first power storage amount index is a value obtained by integrating a charging/discharging current of the first charging/discharging element, and
a predetermined upper limit and lower limit are set for the first power storage amount index.

14. The DC bus control system according to claim 13, wherein
the upper limit is a value corresponding to a maximum charging operation of the second charging/discharging element or the charging element, and the lower limit is a value corresponding to a maximum discharging operation of the second charging/discharging element or the discharging element.

\* \* \* \* \*